(12) United States Patent
Denissen et al.

(10) Patent No.: US 10,976,479 B2
(45) Date of Patent: Apr. 13, 2021

(54) LIGHT CONCENTRATOR MODULE WITH HIGH REFRACTIVE INDEX INTERCONNECT

(71) Applicant: SIGNIFY HOLDING B.V., Eindhoven (NL)

(72) Inventors: Cornelis Johannes Maria Denissen, Nuth (NL); Dirk Kornelis Gerhardus De Boer, Den Bosch (NL); Hendrik Johannes Boudewijn Jagt, Eersel (NL); Leendert Van Der Tempel, Eindhoven (NL); Gerald Frederik Belder, Eindhoven (NL); Johannes Martinus Jansen, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/496,941

(22) PCT Filed: Mar. 15, 2018

(86) PCT No.: PCT/EP2018/056525
§ 371 (c)(1),
(2) Date: Sep. 23, 2019

(87) PCT Pub. No.: WO2018/177760
PCT Pub. Date: Oct. 4, 2018

(65) Prior Publication Data
US 2020/0088927 A1 Mar. 19, 2020

(30) Foreign Application Priority Data
Mar. 28, 2017 (EP) ..................................... 17163208

(51) Int. Cl.
*F21V 8/00* (2006.01)
*G02B 27/30* (2006.01)

(52) U.S. Cl.
CPC ......... *G02B 6/0003* (2013.01); *G02B 6/0008* (2013.01); *G02B 6/0055* (2013.01); *G02B 6/0068* (2013.01); *G02B 27/30* (2013.01)

(58) Field of Classification Search
CPC .... G02B 6/0003; G02B 6/0008; G02B 27/30; F21S 41/24; F21S 41/322; F21S 43/243; F21V 5/10; F21V 7/0091
See application file for complete search history.

(56) References Cited

U.S. PATENT DOCUMENTS

2006/0227570 A1\* 10/2006 Rutherford ............ H04N 9/315
362/612
2008/0079910 A1\* 4/2008 Rutherford ........ G03B 21/2013
353/84
(Continued)

FOREIGN PATENT DOCUMENTS

WO 2015028334 A1 3/2015
WO 2014198619 A1 8/2015
(Continued)

OTHER PUBLICATIONS

Christophen Hoelen, et al: "LED light enginer concept with ultra-high scalable luminance". Proc of SPIE, vol. 9768 976810-2; http://proceedings.spiedigitallibrary.org/.

*Primary Examiner* — Alexander K Garlen
(74) *Attorney, Agent, or Firm* — Daniel J. Piotrowski

(57) ABSTRACT

The invention provides a lighting device (1) comprising: —one or more light sources (10) configured to provide light source light (11); —a luminescent element (5) comprising an elongated light transmissive body (100); the elongated light transmissive body (100) comprising a luminescent material (120) configured to convert at least part of light source light (11) received at one or more radiation input faces (111) into luminescent material light (8), and the luminescent element (5) configured to couple at least part of the luminescent
(Continued)

material light (8) out at the first radiation exit window (112) as converter light (101); wherein the light transmissive body (100) has a first index of refraction n1; —a beam shaping optical element (224) optically coupled with the first radiation exit window (112), the beam shaping optical element comprising a radiation entrance window (211) configured to receive at least part of the converter light (101); wherein the beam shaping optical element (224) has a second index of refraction n2; wherein: $-0.75 \leq n1/n2 \leq 1.25$; 15 —the beam shaping optical element (224) or an optical connector (300) configured between the elongated light transmissive body (100) and the beam shaping optical element (224) comprise a glass material (310), wherein the glass material (310) is based on at least one or more of bismuth oxide, boron oxide, potassium oxide, lithium oxide, phosphorus oxide, lead oxide, tin oxide, antimony oxide, tellurium oxide, silicon dioxide, and vanadium oxide.

13 Claims, 6 Drawing Sheets

(56) References Cited

U.S. PATENT DOCUMENTS

| | | | |
|---|---|---|---|
| 2009/0196046 A1* | 8/2009 | Rutherford | G02B 6/0003 362/296.02 |
| 2009/0244923 A1* | 10/2009 | Hofmann | A61B 1/00117 362/574 |
| 2013/0111953 A1 | 5/2013 | Maloney et al. | |
| 2016/0018692 A1 | 1/2016 | Park | |
| 2016/0054501 A1* | 2/2016 | Hikmet | G02B 6/0003 362/606 |
| 2016/0377785 A1* | 12/2016 | Chestakov | G02B 19/0066 362/606 |

FOREIGN PATENT DOCUMENTS

| | | |
|---|---|---|
| WO | 2015113979 A1 | 8/2015 |
| WO | 2016075014 A1 | 5/2016 |

* cited by examiner

LIGHT CONCENTRATOR MODULE WITH HIGH REFRACTIVE INDEX INTERCONNECT

CROSS-REFERENCE TO PRIOR APPLICATIONS

This application is the U.S. National Phase application under 35 U.S.C. § 371 of International Application No. PCT/EP2018/056525, filed on Mar. 15, 2018, which claims the benefit of European Patent Application No. 17163208.6, filed on Mar. 28, 2017. These applications are hereby incorporated by reference herein.

FIELD OF THE INVENTION

The invention relates to a lighting device, such as for use in a projector or for use in stage lighting. Further, the invention relates to an image projection system, luminaire and a headlight or a taillight of a motor vehicle comprising such lighting device. Yet further, the invention also relates to a method of producing such lighting device.

BACKGROUND OF THE INVENTION

Luminescent rods are known in the art. WO2014/198619, for instance, describes a light emitting device comprising a light source adapted for, in operation, emitting light with a first spectral distribution, a first light guide comprising a first light input surface and a first light exit surface arranged opposite to one another, and further comprising an end surface extending perpendicular with respect to the first light input surface, and a second light guide comprising a second light input surface and a second light exit surface extending perpendicular with respect to one another. The first light guide is adapted for receiving the light with the first spectral distribution from the light source at the first light input surface, guiding the light with the first spectral distribution to the first light exit surface and to the end surface and coupling a part of the light with the first spectral distribution out of the first light exit surface into the second light guide and coupling another part of the light with the first spectral distribution out of the end surface. The second light guide is adapted for receiving light with the first spectral distribution coupled out of the first light guide at the second light input surface, guiding the light to the second light exit surface, converting at least a part of the light with the first spectral distribution to light with a second spectral distribution and coupling the light with the second spectral distribution out of the second light exit surface. WO2015/113979 A1 discloses a light emitting device with a light guide comprising a luminescent material, and multiple light source that couple light into the light guide. Converted light is coupled out of the light guide.

SUMMARY OF THE INVENTION

High brightness light sources are interesting for various applications including spots, stage-lighting, headlamps and digital light projection (DLP), etc. For this purpose, it is possible to make use of so-called light concentrators where shorter wavelength light is converted to longer wavelengths in a highly transparent luminescent material. A rod of such a transparent luminescent material can be illuminated by LEDs to produce longer wavelengths within the rod. Converted light which will stay in the luminescent material, such as a (trivalent cerium) doped garnet, in the waveguide mode and can then be extracted from one of the (smaller) surfaces leading to an intensity gain.

In embodiments, the light concentrator may comprise a rectangular bar (rod) of a phosphor doped, high refractive index garnet, capable to convert blue light into green light and to collect this green light in a small étendue output beam. The rectangular bar may have six surfaces, four large surfaces over the length of the bar forming the four side walls, and two smaller surfaces at the end of the bar, with one of these smaller surfaces forming the "nose" where the desired light is extracted.

Under e.g. blue light radiation, the blue light excites the phosphor, after the phosphor start to emit green light in all directions, assuming some cerium comprising garnet applications. Since the phosphor is embedded in—in general—a high refractive index bar, a main part of the converted (green) light is trapped into the high refractive index bar and wave guided to the nose of the bar where the (green) light may leave the bar. The amount of (green) light generated is proportional to the amount of blue light pumped into the bar. The longer the bar, the more blue LED's can be applied to pump phosphor material in the bar and the number of blue LED's to increase the brightness of the (green) light leaving at the nose of the bar can be used. The phosphor converted light, however, can be split into two parts.

A first part consists of first types of light rays that will hit the side walls of the bar under angles larger than the critical angle of reflection. These first light rays are trapped in the high refractive index bar and will traverse to the nose of the bar where it may leave as desired light of the system.

A part of the light may (thus) not escape from the bar or rod at the nose thereof. Further, light that leaves the rod or bar may not have the desired beam shape. It appears that light extraction and/or beam shaping and/or a good optical coupling is desirable, especially for a high output with the desired beam shape.

Hence, it is an aspect of the invention to provide an alternative lighting device comprising a luminescent concentrator, which preferably further at least partly obviates one or more of above-described drawbacks and/or which may have a relatively higher efficiency. The present invention may have as object to overcome or ameliorate at least one of the disadvantages of the prior art, or to provide a useful alternative.

To increase the extraction of light from the front of the rod or bar extraction optics may be attached to the rod. An embodiment of the extraction optics is a so-called CPC (Compound Parabolic Concentrator). In addition to increasing the extraction efficiency, the CPC also pre-collimates the light for use inside e.g. a projector. The beam shaping element, such as a CPC may consist of a regular glass type with a refractive index of about 1.52. To improve optical coupling, an adhesive interconnect may be applied. The adhesive interconnect between the luminescent rod and the CPC may be a silicone material with a refractive index of e.g. about 1.5-1.6. The luminescent rod or bar is typically a garnet material such as LuAG:Ce, LuYAG:Ce, YAG:Ce or GdYAG:Ce. The refractive index of all of these materials is very similar and about 1.84.

Hence, the invention provides a lighting device ("device") comprising:

one or more light sources configured to provide light source light (at one or more radiation input faces of a light transmissive body);

a luminescent element comprising an elongated light transmissive body ("body" or "elongated body" or "light transmissive body") having a first face and a second face defining a length (L) of the light transmissive body, the light transmissive body comprising one or more radiation input faces and a first radiation exit window, wherein the second face comprises the first radiation exit window; the elongated light transmissive body comprising a luminescent material configured to convert at least part of light source light received at one or more radiation input faces into luminescent material light, and the luminescent element configured to couple at least part of the luminescent material light out at the first radiation exit window as converter light; wherein the light transmissive body has a first index of refraction n1;

a beam shaping optical element ("optical element" or "beam shaping element") optically coupled with the first radiation exit window, the beam shaping optical element comprising a radiation entrance window configured to receive at least part of the converter light; wherein the beam shaping optical element has a second index of refraction n2; wherein:

especially $0.5 \leq n1/n2 \leq 1.25$, more especially $0.75 \leq n1/n2 \leq 1.25$; such as $0.85 \leq n1/n2 \leq 1.25$, like $0.85 \leq n1/n2 \leq 1.18$, such as $0.85 \leq n1/n2 \leq 1.05$;

(i) the beam shaping optical element or (ii) an optical connector configured between the elongated light transmissive body and the beam shaping optical element, comprises a glass material, wherein the glass material is based on at least one or more of bismuth oxide, boron oxide, potassium oxide, lithium oxide, phosphorus oxide, lead oxide, tin oxide, antimony oxide, tellurium oxide, silicon dioxide, and vanadium oxide. In embodiments, such glass material may be based on at least (a) $Bi_2O_3$ or PbO and one or more of ZnO and $B_2O_3$, or based on at least (b) $Bi_2O_3$ and one or more of ZnO, $B_2O_3$, and $P_2O_5$.

With such beam shaping optical element light outcoupling may be more efficient and the desired beam shape may be obtained. Due to the matching indices of refraction, outcoupling may be more efficient.

In specific embodiments, $n1/n2 \leq 1.08$. Especially, $0.9 \leq n1/n2 \leq 1.1$, even more especially $0.95 \leq n1/n2 \leq 1.08$, such as $0.95 \leq n1/n2 \leq 1.05$.

Further, with such optical connector or with a direct connection, a robust combination of elongated body and beam shaping element may be provided. Hence, an improved reliability of the rod-optic connection may be obtained. Further, there may be a reduced sensitivity to degradation due to temperature and/or light flux density, as essentially no browning or discoloration may take place with such connector. Further, there may be a reduced risk of losing the interconnect bond function over life time (bond breakage, delamination) due to ageing effects. Hence, an improved bonding strength and an improved adhesion may be achieved, due to a stronger component strength which may be less sensitive to failure due to shock and/or vibration.

Matching indices may be obtained when e.g. both the elongated body and the beam shaping element comprise the same materials, or may essentially consist of the same materials. Hence, in specific embodiments the elongated light transmissive body comprises a garnet material. In such embodiments, the beam elongated body may further comprise a luminescent material, for instance the garnet material being doped with trivalent cerium (see also below), but the beam shaping element essentially not having luminescent properties, i.e. the beam shaping element comprising the same garnet material but without the luminescent properties, i.e. essentially without the trivalent cerium as dopant. Hence, in specific embodiments the elongated light transmissive body and the beam shaping optical element comprises a garnet material. Further aspects of garnet luminescent concentrators are further elucidated below.

The beam shaping optical element and the elongated body are especially configured in optical coupling.

Instead of the terms "optical coupling" or "optical contact" also the term "radiationally coupled" may be used. The terms "radiationally coupled" or "radiatively coupled" especially mean that the luminescent body (i.e. the elongated light transmissive body) and the beam shaping optical element are associated with each other so that at least part of the radiation emitted by the luminescent body is received by the beam shaping optical element. The luminescent body and the beam shaping optical element, especially the indicated "windows", may in embodiments be in physical contact with each other or may in other embodiments in separated from each other with a (thin) layer of optical glue, e.g. having a thickness of less than about 1 mm, preferably less than 100 µm. Likewise, the light sources are radiationally coupled with the luminescent body, though in general the light sources are not in physical contact with the luminescent body (see also below). As the luminescent body is a body and as in general also the beam shaping optical element is a body, the term "window" herein may especially refer to side or a part of a side.

In the present invention, the optical coupling may be achieved in a number of ways.

In embodiments, the elongated light transmissive body and the beam shaping optical element are associated to each other with a glass frit connection. In this way, the herein described glass materials may be configured as frit between the beam shaping element and the elongated body. The glass material, or the material to form a glass may be melted, by which a vitrified glass is obtained. When contacting the beam shaping optical element and the elongated body with the (frit) glass in between at a temperature above the softening point (more precisely with a viscosity $<10^{8.5}$ dPas (such as indicated in Wilhelm Eitel, Silicate science, Volume VIII: Industrial glass: glazes and enamels, Academic Press 1976, § 187 and 248), the elements may be bonded to each other. In this way, the glass material forms a frit connection between the beam shaping optical element and the elongated body upon cooling below the annealing point.

Especially, the glass material is chosen such that its index of refraction, a third index of refraction (n3), matches the indices of refraction of the beam shaping optical element and the elongated body. Hence, the index of refraction of the optical connector may be in the same range as indicated for n1 and n2. Hence, the glass material (of the optical connector) may have a third index of refraction n3, for which (the overlapping range of the following formulas) may apply: $0.5 \leq n1/n3 \leq 1.25$ and $0.5 \leq n2/n3 \leq 1.25$, especially $0.75 \leq n1/n3 \leq 1.25$ and $0.75 \leq n2/n3 \leq 1.25$, even more especially $0.85 \leq n1/n3 \leq 1.25$ and $0.85 \leq n2/n3 \leq 1.25$, such as $0.85 \leq n1/n3 \leq 1.18$ and $0.85 \leq n2/n3 \leq 1.18$, yet even more especially $0.85 \leq n1/n3 \leq 1.05$ and $0.85 \leq n2/n3 \leq 1.05$. Therefore, in specific embodiments one or more of $0.75 \leq n1/n3 \leq 1.25$ and $0.75 \leq n2/n3 \leq 1.25$ may apply.

In embodiments especially $n1 \leq n3 \leq n2$ or $n2 \leq n3 \leq n1$ may apply. Especially, if $n2 < n1$, then $n3 > n2$, especially in view of efficiency considerations; if $n2 \geq n1$, then $n3 \geq n1$.

Hence, the glass material may provide a frit glass connection between the beam shaping element and the elongated body. In this way, a thin optical connector is configured between the beam shaping element and the elongated body with in fact at both side glass frit connections. The glass frit connection may comprise a chemical bonding and/or Van der Waals forces. Hence, in embodiments the elongated light transmissive body and the beam shaping optical element are associated to each other via the optical connector, wherein the elongated light transmissive body and the optical connector and the optical connector and the beam shaping optical element are associated to each other with glass frit connections, and wherein the beam shaping optical element comprises an optical element material different from the glass material. Alternatively, one may perceive the optical connector as being a frit connecting the beam shaping element and the elongated body.

The frit connection(s) may lead to some ion exchange. For instance, some ions of the beam shaping optical element or the elongated body may penetrate into the optical connector. Also the other way around, some frit ions penetrate into the beam shaping optical element or elongated body. Frit connections or seals are known in the art, such as in incandescent light bulbs and cathode ray tubes.

In other specific embodiments, the beam shaping element may comprise the glass material. In such embodiments, the interface surface of the beam shaping element may be heated above the softening point and bonded to the elongated body. In such a way, the beam shaping element is bonded to the elongated body. In such embodiments, there is no optical connector, as the beam shaping element may be directly connected to the elongated body and ion exchange may occur between the beam shaping element and the elongated body. Such a connection may especially be a chemical and/or adhesive connection, and is a direct connection between the elongated body and the beam shaping element. Such connection is herein also called "frit connection" or "glass frit connection". Here, however, there is no intermediate optical connector. Also here, the frit connection(s) may lead to some ion exchange. For instance, some ions of the beam shaping optical element may penetrate into the elongated body. Also the other way around, some elongated body ions may penetrate into the beam shaping optical element. For instance, some cations like Y, Al, Bi, etc., may migrate from beam shaping element into the elongated body or vice versa.

The glass material has to comply with a plurality of conditions. Not only the index of refraction is relevant, also the linear thermal expansion, the softening point, the water resistance, and of course the transparency are relevant. It surprisingly appeared that specific glass compositions can comply with one or more, especially a plurality of these conditions. Such glass material may in embodiments especially be based on at least $Bi_2O_3$ and one or more of ZnO, $B_2O_3$, and $P_2O_5$. Especially such materials may provide the desired glass properties, whereas other compositions do not. The phrase "glass material based on" and similar phrases indicate that glass compositions are provided that are especially mixed oxides of the indicated oxides. A mixed oxide that might be available is e.g. $Bi_2ZnB_2O_7$. The compositions of such glasses are indicated in the art with the oxides from which they are made.

As indicated above, in embodiments the glass material at least comprises $Bi_2O_3$. Especially bismuth oxide may be used because of the relative low melting temperature and the relative high index of refraction, which is of interest for matching with elongated elements also having a relative high index of refraction, such as YAG garnets or other similar garnets (see also below).

In further embodiments, the glass material at least comprises $Bi_2O_3$ and $B_2O_3$, and optionally one or more other components. In further specific embodiments the glass material is based on at least $Bi_2O_3$, ZnO, and $B_2O_3$. In yet further specific embodiments the glass material is based on at least $Bi_2O_3$ and ZnO, and one or more of $B_2O_3$ and $P_2O_5$. Hence, the glass material may optionally comprise ZnO and may thus in specific embodiments at least comprise ZnO. Further, $B_2O_3$ and/or $P_2O_5$ may be used. In yet further specific embodiments, the glass material is based on at least $Bi_2O_3$, ZnO, and $B_2O_3$. Such embodiments appear to provide relatively good results.

In specific embodiments the glass material has a composition for which one or more of the following applies: (i) 3-90 wt. % $B_2O_3$, (ii) 5-95 wt. % $Bi_2O_3$, and (iii) 0-40 wt. % ZnO, especially wherein all three conditions apply. Even more especially the glass material has a composition for which one or more of the following applies: (i) 5-50 wt. % $B_2O_3$, (ii) 30-95 wt. % $Bi_2O_3$, and (iii) 0-40 wt. % ZnO, especially wherein all three conditions apply. In embodiments, ZnO may be available with at least 5 wt. %. The weight percentages herein do not necessarily add up to 100 wt. % as optionally also other materials may be present in the glass, such as one or more of $SiO_2$, $R_2O$, wherein R comprises one or more of Li, Na and K.

Good results were obtained with compositions that are defined by the area between the solid lines in FIG. 3. This area can in a first order approximation be defined by the following compositions (which are defined as "edge points"), which are indicated in mol percentages in below table:

| mol % $B_2O_3$ | mol % $Bi_2O_3$ | mol % ZnO |
| --- | --- | --- |
| 25 mol % | 7.5 mol % | 67.5 mol % |
| 80 mol % | 20 mol % | 0 mol % |
| 65 mol % | 35 mol % | 0 mol % |
| 22.5 mol % | 20 mol % | 57.5 mol % |

Hence, specific embodiments of the composition of the glass may be defined by a ternary system wherein the compositions define a quadrilateral area in the ternary diagram in mol %.

The above mol percentages may also be indicated in weight percentages, yet the aforementioned area is not quadrilateral in a ternary diagram in wt. %:

| wt. % $B_2O_3$ | wt. % $Bi_2O_3$ | wt. % ZnO |
| --- | --- | --- |
| 16 wt. % | 33 wt. % | 51 wt. % |
| 37 wt. % | 63 wt. % | 0 wt. % |
| 22 wt. % | 78 wt. % | 0 wt. % |
| 10 wt. % | 60 wt. % | 30 wt. % |

Especially, the glass may thus be based on least $Bi_2O_3$ and one or more of $Bi_2O_3$ and $B_2O_3$, and optionally ZnO, yet more especially at least $Bi_2O_3$ and $B_2O_3$ and ZnO. Especially, in other embodiments the glass may thus be based on least $Bi_2O_3$ and one or more of ZnO, $B_2O_3$, and $P_2O_5$, even more especially at least $Bi_2O_3$ and $B_2O_3$, and optionally ZnO, yet more especially at least $Bi_2O_3$ and $B_2O_3$ and ZnO.

In specific embodiments, at least 80 wt. % of the glass material consists on the herein indicated oxide materials. Therefore, in a specific embodiment, the glass material consists of at least 80 wt. % of $Bi_2O_3$ and one or more of ZnO, $B_2O_3$.

Further, it appears desirable when the coefficient of linear thermal expansion, especially the linear thermal expansion coefficients of the elongated body and the beam shaping optical element are essentially the same, and/or wherein the linear thermal expansion coefficients of the elongated body and the glass material are essentially the same, and/or wherein the linear thermal expansion coefficients of the glass material and the beam shaping optical element are essentially the same. Hence, in specific embodiments the light transmissive body has a first coefficient of linear thermal expansion CTE1, wherein the beam shaping optical element has a second coefficient of linear thermal expansion CTE2, and wherein the optional optical connector has a third coefficient of linear thermal expansion CTE3, wherein the difference between linear thermal expansion of the light transmissive body and the beam shaping element may especially be at most ±2 ppm/K, like at most ±1 ppm/K, such as especially at most ±0.5 ppm/K.

Further, when the optical connector, the difference between the linear thermal expansion of the light transmissive body and the glass material of the optical connector may especially be at most ±5 ppm/K (i.e. parts per million per degree K), more especially at most ±2 ppm/K, like at maximum ±1 ppm/K, such as especially at maximum ±0.5 ppm/K. Yet further, the difference between the linear thermal expansion of the beam shaping element and the glass material of the optical connector may especially be at most ±5 ppm/K (i.e. parts per million per degree K), more especially at most ±2 ppm/K, like at maximum ±1 ppm/K, such as especially at maximum ±0.5 ppm/K.

The term "±5 ppm/K" indicates a range of −5 to +5 ppm/K. Hence, one may have an up to 5 ppm/K higher or lower coefficient of linear thermal expansion, but thus also smaller differences are included in such range, as a difference of 3 ppm/K. Likewise, this applies to the other ranges.

Therefore, in specific embodiments the light transmissive body has a first coefficient of linear thermal expansion, wherein the beam shaping optical element has a second coefficient of linear thermal expansion, and wherein the optional optical connector has a third coefficient of linear thermal expansion, wherein a difference between the first coefficient of linear thermal expansion (of the light transmissive body) and the second coefficient (of the beam shaping element) is at most ±1 ppm/K, wherein a difference between the first coefficient of linear thermal expansion and the third coefficient is at most ±1 ppm/K, and wherein a difference between the second coefficient of linear thermal expansion and the third coefficient is at most ±1 ppm/K.

Unless indicated otherwise, indices of refraction, etc. etc., are especially evaluated at standard conditions (room temperature, such as about 20° C., and atmospheric pressure, such as 1 bar). Differences in coefficients of thermal expansion may also apply to higher temperatures as well. For instance, especially the above indicated upper limit(s) for the differences in coefficients of thermal expansion apply to temperatures up to close the glass temperature of the glass composition, such as in the range of RT up to $T_g-20°$ C., such as in the range of RT up to $T_g-10°$ C., for instance over a temperature range of 20-100° C., or an even larger range.

The elongated body may have the shape of a bar or a rod. The former may have a square or rectangular cross-section, especially rectangular; the latter a circular or oval, especially circular cross-section.

The beam shaping element may be a solid body comprising light transmissive material, as indicated further below.

The optical element is especially arranged with a light input face in optical connection with a light exit surface of the light guide. The optical element may thus be made of a material having a high refractive index, in an embodiment a refractive index which is equal to the light guide.

Further, in embodiments the optical element may comprise a quadrangular cross section and two tapered sides. The tapered sides and may be inclined outwardly from the light exit surface of the light guide such that the light exit face of the optical element has a larger surface area than both the light input face and the light exit surface of the light guide. The optical element may alternatively have more than two, particularly four, tapered sides. In an alternative, the optical element has a circular cross section and one circumferential tapered side. With such an arrangement light will be reflected at the inclined sides and has a large chance to escape if it hits the light exit face, as the light exit face is large compared to the light input face. The shape of the sides and may also be curved and chosen such that all light escapes through the light exit face.

The optical element may for example have the shape of a collimator, or may have a cross-sectional shape of a trapezoid and in an embodiment outside surfaces of the trapezoid shape are provided with reflective layers. Thereby the received light may be shaped such as to comprise a larger spot size while simultaneously minimizing the loss of light through other surfaces than the light exit surface, thus also improving the intensity of the emitted light. In another embodiment the optical element has the shape of a lens array, for example convex or concave lenses or combinations thereof. Thereby the received light may be shaped such as to form focused light, defocused light or a combination thereof. In case of an array of lenses it is furthermore feasible that the emitted light may comprise two or more separate beams each formed by one or more lenses of the array.

The optical element may also be a light concentrating element (not shown) arranged at the light exit surface of the light guide. The light concentrating element may in embodiments comprises a quadrangular cross section and two outwardly curved sides such that the light exit surface of the light concentrating element has a larger surface area than the light exit surface of the light guide.

The light concentrating element may alternatively have more than two, particularly four, tapered sides.

The light concentrating element may be a compound parabolic light concentrating element (CPC) having parabolic curved sides. In an alternative, the light concentrating element has a circular cross section and one circumferential tapered side.

Actually, not all light will be extracted since there will be Fresnel reflections at the interface between the optical element or the light concentrating element and the external medium, generally being air. These Fresnel reflections may be reduced by using an appropriate anti-reflection coating, i.e. a quarter-lambda dielectric stack or moth-eye structure. In case the light output as function of position over the light exit face is inhomogeneous, the coverage with anti-reflection coating might be varied, e.g. by varying the thickness of the coating.

One of the interesting features of a CPC is that the etendue (=$n^2 \times$ area $\times$ solid angle, where n is the refractive index) of the light is conserved. The shape and size of the light input face of the CPC can be adapted to those of the light exit surface of the light guide and/or vice versa. A large advantage of a CPC is that the incoming light distribution is transformed into a light distribution that fits optimally to the acceptable etendue of a given application. The shape of the light exit face of the CPC may be e.g. rectangular or circular, depending on the desires. For example, for a digital projector there will be requirements to the size (height and width) of the beam, as well as for the divergence. The corresponding etendue will be conserved in a CPC. In this case it will be beneficial to use a CPC with rectangular light input and exit faces having the desired height/width ratio of the display panel used. For a spot light application, the requirements are less severe. The light exit face of the CPC may be circular, but may also have another shape (e.g. rectangular) to illuminate a particularly shaped area or a desired pattern to project such pattern on screens, walls, buildings, infrastructures etc. Although CPCs offer a lot of flexibility in design, their length can be rather large. In general, it is possible to design shorter optical elements with the same performance. To this end, the surface shape and/or the exit surface may be adapted, e.g. to have a more curved exit surface such as to concentrate the light. One additional advantage is that the CPC can be used to overcome possible aspect ratio mismatches when the size of the light guide is restrained by the dimensions of the LED and the size of the light exit face is determined by the subsequent optical components. Furthermore, it is possible to place a mirror (not shown) partially covering the light exit face of the CPC, e.g. using a mirror which has a 'hole' near or in its center. In this way the exit plane of the CPC is narrowed down, part of the light is being reflected back into the CPC and the light guide, and thus the exit etendue of the light would be reduced. This would, naturally, decrease the amount of light that is extracted from the CPC and light guide. However, if this mirror has a high reflectivity, the light can be effectively injected back into the CPC and light guide, where it may be recycled by TIR. This will not change the angular distribution of the light, but it will alter the position at which the light will hit the CPC exit plane after recycling thus increasing the luminous flux. In this way, part of the light, that normally would be sacrificed in order to reduce the system etendue, can be re-gained and used to increase for example the homogeneity. This is of major importance if the system is used in a digital projection application. By choosing the mirror in the different ways, the same set of CPC and light guide can be used to address systems using different panel sizes and aspect ratios, without having to sacrifice a large amount of light. In this way, one single system can be used for various digital projection applications. Hence, in embodiments the beam shaping optical element comprises a light concentrator, especially a compound parabolic concentrator.

Further, it appears that relative thin elongated elements provide best results. With rather thin elongated elements it appears that very well e.g. entendues of about 16.5 mm² sr can be achieved. Therefore, in specific embodiments the light transmissive body has a bar-like shape having a width (W) and a high (H), wherein the width (W) is equal to or smaller than 1.7 mm, and wherein the height (H) is equal to or smaller than 1.1 mm.

Yet, the invention also provides the elongated body and beam shaping element assembly per se. Hence, in yet a further aspect the invention also provides a first assembly comprising:

an elongated light transmissive body having a first face and a second face defining a length (L) of the light transmissive body, the light transmissive body comprising one or more radiation input faces and a first radiation exit window, wherein the second face comprises the first radiation exit window; the elongated light transmissive body comprising a luminescent material (with such luminescent material especially being configured to convert at least part of light source light (received at one or more radiation input faces) into luminescent material light, when such light source light is provided (to the elongated light transmissive body), and the luminescent element being configured to couple at least part of the luminescent material light out at the first radiation exit window as converter light);

a beam shaping optical element optically coupled with the first radiation exit window, the beam shaping optical element comprising a radiation entrance window (configured to receive at least part of the converter light); wherein the beam shaping optical element has a second index of refraction n2; wherein:

$0.5 \leq n1/n2 \leq 1.25$; especially $0.75 \leq n1/n2 \leq 1.25$; such as $0.85 \leq n1/n2 \leq 1.25$, such as $0.85 \leq n1/n2 \leq 1.05$;

the beam shaping optical element comprises a glass material, wherein the glass material is based on at least one or more of bismuth oxide, boron oxide, potassium oxide, lithium oxide, phosphorus oxide, lead oxide, tin oxide, antimony oxide, tellurium oxide, silicon dioxide, and vanadium oxide, such as wherein the glass material is in embodiments based on (a) at least $Bi_2O_3$ and one or more of ZnO, $B_2O_3$, or in embodiments based on (b) at least $Bi_2O_3$ and $B_2O_3$, and one or more of ZnO, $Li_2O$, $Al_2O_3$, BaO, $SiO_2$, $TiO_2$, $GeO_2$, SnO and $P_2O_5$, or in embodiments based on (c) at least $Bi_2O_3$ and $B_2O_3$, and optionally one or more of $K_2O$, $Li_2O$, $TeO_2$, $TiO_2$, PbO, $Sb_2O_3$, SnO, $V_2O_5$, and $P_2O_5$; and the elongated light transmissive body and the beam shaping optical element are associated to each other with a glass frit connection.

For instance, such assembly may comprise a garnet based elongated element with the beam shaping element comprising a glass that is melted to the elongated element.

Hence, the invention also provides a second assembly comprising:

an elongated light transmissive body having a first face and a second face defining a length (L) of the light transmissive body, the light transmissive body comprising one or more radiation input faces and a first radiation exit window, wherein the second face comprises the first radiation exit window; the elongated light transmissive body comprising a luminescent material (with such luminescent material especially being configured to convert at least part of light source light (received at one or more radiation input faces) into luminescent material light when such light source light is provided (to the elongated light transmissive body), and the luminescent element configured to couple at least part of the luminescent material light out at the first radiation exit window as converter light);

a beam shaping optical element optically coupled with the first radiation exit window, the beam shaping optical element comprising a radiation entrance window (configured to receive at least part of the converter light); wherein the beam shaping optical element has a second index of refraction n2; wherein:

$0.75 \leq n1/n2 \leq 1.25$; such as $0.85 \leq n1/n2 \leq 1.25$, such as $0.85 \leq n1/n2 \leq 1.05$;

an optical connector configured between the elongated light transmissive body and the beam shaping optical element comprising a glass material, wherein the glass material is based on at least one or more of bismuth oxide, boron oxide, potassium oxide, lithium oxide, phosphorus oxide, lead oxide, tin oxide, antimony oxide, tellurium oxide, silicon dioxide, and vanadium oxide, such as wherein the glass material is based on (a) at least $Bi_2O_3$ and one or more of ZnO, $B_2O_3$, or in embodiments based on (b) at least $Bi_2O_3$ and $B_2O_3$, and one or more of ZnO, $Li_2O$, $Al_2O_3$, BaO, $SiO_2$, $TiO_2$, $GeO_2$, SnO and $P_2O_5$, or in embodiments based on (c) at least $Bi_2O_3$ and $B_2O_3$, and optionally one or more of $K_2O$, $Li_2O$, $TeO_2$, $TiO_2$, PbO, $Sb_2O_3$, SnO, $V_2O_5$, and $P_2O_5$; and wherein the elongated light transmissive body and the beam shaping optical element are associated to each other via the optical connector, wherein the beam shaping optical element comprises an optical element material different from the glass material.

The optical connector is thus especially an intermediate (small) body of a material different from the beam shaping element and different from the elongated body, which provides a connection between these elements as glass frit.

The invention also provides a lighting device comprising one or more of the assemblies as defined herein. Especially, the invention also provides a lighting device comprising one or more of the assemblies as defined herein and one or more light sources configured to couple light source light into the elongated light transmissive body. One or more light source may provide light to one or more edge faces and/or one or more light sources may provide light to the first face (end of the elongated body, opposite of the nose). For instance, one or more light sources may be used to provide to the first face. However, as indicated herein, especially one or more light sources are configured to provide light source light to one or more radiation input faces.

Yet further, the invention also provides a spot lighting system comprising such lighting device as described herein and/or an image projection system comprising such lighting device as described herein.

In yet a further aspect, the invention also provides a method of producing the lighting device as defined herein, the method comprising (i) providing the elongated light transmissive body, the beam shaping optical element, and the optical connector, (ii) melting at least part of the glass material, and associating the elongated light transmissive body and the beam shaping optical element with the optical connector in between, (iii) providing one or more light sources at one or more radiation input faces. Such method may thus include associating the beam shaping element to the elongated body by heating the beam shaping element, or at least part thereof (that is to be connected to the elongated light transmissive body), to the softening point, thereby forming a direct bond, or joining these together with the aid of a glass material, which forms frit connections at both sides with the beam shaping element and elongated body, respectively. Typical softening temperatures of at least the interface(s) are 375 to 550° C. The frit glass may be pre-molten on the garnet. Heating may be done directly or indirectly, in an inert atmosphere or in vacuum. For instance, the elongated body may be heated, or at least part thereof that is in proximity to the glass material, whereby the glass material softens and the beam shaping element can be pressed to the elongated body, to provide the assembly with the connector in between. Alternatively or additionally, when the beam shaping element comprises the glass material, part of the beam shaping element may be heated above the softening temperature, and may be pressed against the elongated body, to provide the frit connection between the elongated body and the beam shaping element.

Below, some further (specific) embodiments are described.

As indicated above, the lighting devices may comprise a plurality of light sources to provide light source light that is at least partly converted by the light transmissive body, more especially the luminescent material of the light transmissive body, into converter light. The converted light can at least partially escape form the first radiation exit window, which is especially in optical contact with the beam shaping optical element, more especially the radiation entrance window thereof.

The beam shaping optical element may especially comprises a collimator used to convert (to "collimate") the light beam into a beam having a desired angular distribution. Further, the beam shaping optical element especially comprises a light transmissive body comprising the radiation entrance window. Hence, the beam shaping optical element may be a body of light transmissive material that is configured to collimate the converter light from the luminescent body.

In specific embodiments, the beam shaping optical element comprises a compound parabolic like collimator, such as a CPC (compound parabolic concentrator).

The beam shaping optical element may have cross section (perpendicular to an optical axis) with a shape that is the same as the cross-section of the luminescent body (perpendicular to the longest body axis (which body axis is especially parallel to a radiation input face). For instance, would the latter have a rectangular cross section, the former may also have such rectangular cross section, though the dimension may be different. Further, the dimension of the beam shaping optical element may vary over its length (as it may have a beam shaping function).

As indicated above, first radiation exit window is in optical contact with the radiation entrance window thereof. The term "optical contact" and similar terms, such as "optically coupled" especially mean that the light escaping the first radiation exit window surface area may enter the beam shaping optical element radiation entrance window with minimal losses (such as Fresnel reflection losses or TIR (total internal reflection) losses) due to refractive index differences of these elements. The losses may be minimized by one or more of the following elements: (1) a direct optical contact between the two optical elements, (2) providing an optical glue between the two optical elements, preferably the optically glue having a refractive index higher that the lowest refractive index of the two individual optical elements, (3) providing the two optical elements in close vicinity (e.g. at a distance much smaller than the wavelength of the light), such that the light will tunnel through the material present between the two optical elements, (4) providing an optically transparent interface material between the two optical elements, preferably the optically transparent interface material having a refractive index higher that the lowest refractive index of the two individual optical elements, the optically transparent interface material might be a liquid or a gel or (5) providing optical Anti Reflective coatings on the surfaces of the two individual optical elements.

Hence, the luminescent body comprises one or more side faces, wherein the beam shaping optical element is configured to receive at the radiation entrance window at least part of the converter light that escapes from the one or more side faces.

This radiation may reach the entrance window via a gas, such as air directly. Additionally or alternatively, this radiation may reach the entrance window after one or more reflections, such as reflections at a mirror positioned nearby the luminescent body. Hence, in embodiments the lighting device may further comprise a first reflective surface, especially configured parallel to one or more side faces, and configured at a first distance (d1) from the luminescent body, wherein the first reflective surface is configured to reflect at least part of the converter light that escapes from the one or more side faces back into the luminescent body or to the beam shaping optical element. The space between the reflective surface and the one or more side faces comprises a gas, wherein the gas comprises air. The first distance may e.g. be in the range of 0.1 µm-20 mm, such as in the range of 1 µm-10 mm, like 2 µm-10 mm.

The lighting device may be configured to provide blue, green, yellow, orange, or red light, etc. Further, in specific embodiment, the lighting device may be configured to provide white light. If desired, monochromaticity may be improved using optical filter(s).

The term "light concentrator" or "luminescent concentrator" is herein used, as one or more light sources irradiate a relative large surface (area) of the light converter, and a lot of converter light may escape from a relatively small area (exit window) of the light converter. Thereby, the specific configuration of the light converter provides its light concentrator properties. Especially, the light concentrator may provide Stokes-shifted light, which is Stokes shifted relative to the pump radiation. Hence, the term "luminescent concentrator" or "luminescent element" may refer to the same element, especially an elongated light transmissive body (comprising a luminescent material), wherein the term "concentrator" and similar terms may refer to the use in combination with one or more light sources and the term "element" may be used in combination with one or more, including a plurality, of light sources. When using a single light source, such light source may e.g. be a laser, especially a solid state laser (like a LED laser). The elongated light transmissive body comprises a luminescent material and can herein especially be used as luminescent concentrator. The elongated light transmissive body is herein also indicated as "luminescent body". Especially, a plurality of light sources may be applied.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream".

The light concentrator comprises a light transmissive body. The light concentrator is especially described in relation to an elongated light transmissive body, such as a ceramic rod or a crystal, such as a single crystal. However, these aspects may also be relevant for other shaped ceramic bodies or single crystals. In specific embodiments, the luminescent body comprises a ceramic body or single crystal.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of visible light in a direction perpendicular to the length of the light transmissive body. Without the activator (dopant) such as trivalent cerium, the transmission in the visible might be close to 100%.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam like or rod like, however especially beam like (cuboid like). However, the light transmissive body may also be disk like, etc. The light transmissive body, such as the luminescent concentrator, might be hollow, like a tube, or might be filled with another material, like a tube filled with water or a tube filled with another solid light transmissive medium. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape, such as a bar like shape, and is further configured to provide a single exit window.

In a specific embodiment, the light transmissive body may especially have an aspect ratio larger than 1, i.e. the length is larger than the width. In general, the light transmissive body is a rod, or bar (beam), or a rectangular plate, though the light transmissive body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the light transmissive body. Physical contact may lead to undesired outcoupling and thus a reduction in concentrator efficiency. Further, in general the light transmissive body comprises two substantially parallel faces, the radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive, digital projectors, or high brightness spot light applications, a small but high intense emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high intensity may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon. Generally, the ceramic or crystal bodies are cuboid. In specific embodiments, the body may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, such as 4-20 cm.

Especially, the light transmissive body has a width (W) selected to absorb more than 95% of the light source light. In embodiments, the light transmissive body has a width (W) selected from the range of 0.03-4 cm, especially 0.05-2 cm, such as 0.1-1.5 cm, like 0.1-1 cm. With the herein indicated cerium concentration, such width is enough to absorb substantially all light generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heatsinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The light transmissive body may also be a fiber or a multitude of fibers, for instance a fiber bundle, either closely spaced or optically connected in a transparent material. The fiber may be referred to as a luminescent fiber. The individual fiber may be very thin in diameter, for instance, 0.1 to 0.5 mm. The light transmissive body may also comprise a tube or a plurality of tubes. In embodiments, the tube (or tubes) may be filled with a gas, like air or another gas having higher heat conductivity, such as helium or hydrogen, or a gas comprising two or more of helium, hydrogen, nitrogen, oxygen and carbon dioxide. In embodiments, the tube (or tubes) may be filled with a liquid, such as water or (another) cooling liquid.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting device further comprises a reflector configured to reflect luminescent material light back into the light transmissive body. Therefore, the lighting device may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting device further comprises an optical reflector (at least) configured downstream of the first face and configured to reflect light back into the elongated light transmissive body. Alternatively or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The one or more reflectors may consist of a metal reflector, such as a thin metal plate or a reflective metal layer deposited on a substrate, such as e.g. glass. The one or more reflectors may consist of an optical transparent body containing optical structure to reflect (part) of the light such as prismatic structures. The one or more reflectors may consist of specular reflectors. The one or more reflectors may contain microstructures, such as prism structures or saw tooth structures, designed to refract the light rays towards a desired direction.

Preferably, such reflectors are also present in the plane where the light sources are positioned, such that that plane consist of a mirror having openings, each opening having the same size as a corresponding light source allowing the light of that corresponding light source to pass the mirror layer and enter the elongated (first) light transmissive body while light that traverses from the (first) light transmissive body in the direction of that plane receives a high probability to hit the mirror layer and will be reflected by that mirror layer back towards the (first) light transmissive body.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

For further improving efficiency and/or for improving the spectral distribution several optical elements may be included like mirrors, optical filters, additional optics, etc.

In specific embodiments, the lighting device may have a mirror configured at the first face configured to reflect light back into the elongated light transmissive body, and/or may have one or more of an optical filter, a (wavelength selective) mirror, a reflective polarizer, light extraction structures, and a collimator configured at the second face. At the second face the mirror may e.g. be a wavelength selective mirror or a mirror including a hole. In the latter embodiment, light may be reflected back into the body but part of the light may escape via the hole. Especially, in embodiments the optical element may be configured at a distance of about 0.01-1 mm, such as 0.1-1 mm from the body.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of undesired light in the converter light (downstream of the radiation exit window). For filtering out light source light, optionally an interference filter may be applied.

In yet a further embodiment, the lighting device further comprises a collimator configured downstream of the radiation exit window (of the highest order luminescent concentrator) and configured to collimate the converter light. Such collimator, like e.g. a CPC (compound parabolic concentrator), may be used to collimate the light escaping from the radiation exit window and to provide a collimated beam of light.

As indicated above, the lighting device may comprise a plurality of light sources. These plurality of light sources may be configured to provide light source light to a single side or face or to a plurality of faces; see further also below. When providing light to a plurality of faces, in general each face will receive light of a plurality of light sources (a subset of the plurality of light sources). Hence, in embodiments a plurality of light sources will be configured to provide light source light to a radiation input face. Also this plurality of light sources will in general be configured in a row. Hence, the light transmissive body is elongated, the plurality of light sources may be configured in a row, which may be substantially parallel to the axis of elongated of the light transmissive body. The row of light sources may have substantially the same length as the elongated light transmissive body. Hence, in the light transmissive body has a length (L) in the range of about 80-120% of the second length (L2) of the row of light sources; or the row of light sources has a length in the range of about 80-120% of the length of the light transmissive body.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state light source (such as a LED or laser diode). The term "light source" may also relate to a plurality of light sources, such as e.g. 2-2000, such as 2-500, like 2-100, especially 4-80 (solid state) light sources, though many more light sources may be applied. The term "light source" may also relate to one or more light sources that are tailored to be applied for such light concentrating luminescent concentrators, e.g. one or more LED's having a long elongated radiating surface matching the long elongated light input surfaces of the elongated luminescent concentrator. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB or comparable. Hence, a plurality of semiconductor light sources may be configured on the same substrate. In embodiments, a COB is a multi LED chip configured together as a single lighting module.

The lighting device comprises a plurality of light sources. Especially, the light source light of the plurality (m) of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (e.g. obtained by binning). However, in yet other embodiments, the lighting device may comprise a single light source, especially a solid state light source having a relatively large die. Hence, herein also the phrase "one or more light sources" may be applied.

The light sources are especially configured to provide a blue optical power ($W_{opt}$) of at least 0.2 Watt/mm$^2$ to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for (DLP (digital light processing)) projector applications, the plurality of light sources are operated in pulsed operation with a duty cycle selected from the range of 10-80%, such as 25-70%.

In yet a further embodiment, especially for (LCD or DLP) projector applications using dynamic contrast technologies, such as e.g. described in WO0119092 or USRE42428 (E1), the plurality of light sources are operated in video signal content controlled PWM pulsed operation with a duty cycle selected from the range of 0.01-80%, such as 0.1-70%.

In yet a further embodiment, especially for (LCD or DLP) projector applications using dynamic contrast technologies, such as e.g. described in US patent WO0119092 or U.S. Pat. No. 6,631,995 (B2), the plurality of light sources are operated in video signal content controlled intensity modulated operation with intensity variations selected from the range of 0.1-100%, such as 2-100%.

The lighting device may comprise a plurality of luminescent concentrators, such as in the range of 2-50, like 2-20 light concentrators (which may e.g. be stacked).

The light concentrator may radiationally be coupled with one or more light sources, especially a plurality of light sources, such as 2-1000, like 2-50 light sources. The term "radiationally coupled" especially means that the light source and the light concentrator are associated with each other so that at least part of the radiation emitted by the light source is received by the light concentrator (and at least partly converted into luminescence).

Especially, one or more light sources are configured to provide light source light to one or more the radiation input faces. Hence, in such embodiments lighting of the elongated element is from one or more sides.

Hence, in specific embodiments the luminescent concentrator receives at one or more radiation input faces radiation (pump radiation) from an upstream configured light concentrator or from upstream configured light sources.

Further, the light concentrator comprises a luminescent material configured to convert at least part of a pump radiation received at one or more radiation input faces into luminescent material light, and the luminescent concentrator configured to couple at least part of the luminescent material light out at the radiation exit window as converter light. This converter light is especially used as component of the lighting device light.

The phrase "configured to provide luminescent material light at the radiation exit window" and similar phrases especially refers to embodiments wherein the luminescent material light is generated within the luminescent concentrator (i.e. within the light transmissive body), and part of the luminescent material light will reach the radiation exit window and escape from the luminescent concentrator. Hence, downstream of the radiation exit window the luminescent material light is provided. The converter light, downstream of the radiation exit window comprises at least the luminescent material light escaped via the radiation exit window from the light converter. Instead of the term "converter light" also the term "light concentrator light" may be used. Pump radiation can be applied to a single radiation input face or a plurality of radiation input faces.

In embodiments, the length (L) is selected from the range of 1-100 cm, such as especially 2-50 cm, like at least 3 cm, such as 5-50 cm, like at maximum 30 cm. This may thus apply to all luminescent concentrators. However, the range indicates that the different luminescent concentrators may have different lengths within this range.

In yet further embodiments, the elongated light transmissive body (of the luminescent concentrator) comprises an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm. To obtain sufficient absorption and light output in desired directions, it is advantageous to use transparent rods (especially substantially shaped as beams). Such rod can be used as light concentrator, concentrating over their length light source light from light sources such as LEDs (light emitting diodes), converting this light source light into converter light and providing at an exit surface a substantial amount of converter light. Lighting devices based on light concentrators may e.g. be of interest for projector applications. For projectors, red, green and blue luminescent concentrators are of interest. Green luminescent rods, based on garnets, can be relatively efficient. Such concentrators are especially based on YAG:Ce (i.e. $Y_3Al_5O_{12}:Ce^{3+}$) or LuAG ($Lu_3Al_5O_{12}:Ce^{3+}$). 'Red' garnets can be made by doping a YAG-garnet with Gd ("YGdAG"). Blue luminescent concentrators can be based on YSO ($Y_2SiO_5:Ce^{3+}$) or similar compounds or BAM ($BaMgAl_{10}O_{17}:Eu^{2+}$) or similar compounds, especially configured as single crystal(s). The term similar compounds especially refer to compounds having the same crystallographic structure but where one or more cations are at least partially replaced with another cation (e.g. Y replacing with Lu and/or Gd, or Ba replacing with Sr). Optionally, also anions may be at least partially replaced, or cation-anion combinations, such as replacing at least part of the Al—O with Si—N.

Note that the materials mentioned herein as material for a concentrator may thus in embodiments also be used a beam shaping element material, especially when a low or essentially zero concentration of activator (such as Ce3+) is applied. Hence, for instance an $Y_2SiO_5:Ce^{3+}$ light transmissive body may be connected via the optical connector to a beam shaping element essentially consisting of $Y_2SiO_5$, etc.

Hence, especially the elongated light transmissive body comprises a ceramic material configured to wavelength convert at least part of the (blue) light source light into converter light in e.g. one or more of the green, yellow and red, which converter light at least partly escapes from the radiation exit window. The ceramic material especially comprises an $A_3B_5O_{12}:Ce^{3+}$ ceramic material ("ceramic garnet"), wherein A comprises yttrium (Y) and gadolinium (Gd), and wherein B comprises aluminum (Al). As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises the radiation exit window, wherein the elongated light transmissive body comprises a ceramic material configured to wavelength convert at least part of (blue) light source light into converter light, such as (at least) one or more of green, yellow, and red converter light (which at least partly escapes from the radiation exit window when the elongated light transmissive body is irradiated with blue light source light), wherein the ceramic material comprises an $A_3B_5O_{12}:Ce^{3+}$ ceramic material as defined herein. Such light transmissive body can thus be used as light converter. Especially, such light transmissive body has the shape of a cuboid.

As indicated above, the ceramic material comprises a garnet material. Hence, the elongated body especially comprises a luminescent ceramic. The garnet material, especially the ceramic garnet material, is herein also indicated as "luminescent material". The luminescent material comprises an $A_3B_5O_{12}$:$Ce^{3+}$ (garnet material), wherein A is especially selected from the group consisting of Sc, Y, Tb, Gd, and Lu (especially at least Y and Gd), wherein B is especially selected from the group consisting of Al and Ga (especially at least Al). More especially, A (essentially) comprises yttrium (Y) and gadolinium (Gd), and B (essentially) comprises aluminum (Al). Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}$:$Ce^{3+}$ especially refers to $(Y_{1-x}Gd_x)_3B_5O_{12}$:$Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}$:$Ce^{3+}$ especially refers to $(Yi_{1-x}Gd_x)_3Al_5O_{12}$:$Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}$:$Ce^{3+}$ may also be defined as $(A_{1-n}Ce_n)_3B_5O_{12}$, with n being in the range of 0.001-0.035, such as 0.0015-0.01. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

The luminescent concentrator may also be a crystal, such as a single crystal. Such crystals can be grown/drawn from the melt in a higher temperature process. The large crystal, typically referred to as boule, can be cut into pieces to form the light transmissive bodies. The polycrystalline garnets mentioned above are examples of materials that can alternatively also be grown in single crystalline form.

After obtaining the light transmissive body, the body may be polished. Before or after polishing an annealing process (in an oxidative atmosphere) may be executed, especially before polishing. In a further specific embodiment, the annealing process lasts for at least 2 hours, such as at least 2 hours at at least 1200° C. Further, especially the oxidizing atmosphere comprises for example $O_2$.

Instead of cerium doped garnets, or in addition to such garnets, also other luminescent materials may be applied, e.g. embedded in organic or inorganic light transmissive matrixes, as luminescent concentrator. For instance quantum dots and/or organic dyes may be applied and may be embedded in transmissive matrixes like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, or nano-wires.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Several color conversion schemes may be possible. Especially, however, the Stokes shift is relatively small. Especially, the Stokes shift, defined as the difference (in wavelength) between positions of the band maxima of the light source used for pumping and the light which is emitted, is not larger than 100 nm; especially however, the Stokes shift is at least about 10 nm, such as at least about 20 nm. This may especially apply to the light source light to first luminescent material light conversion, but also apply to the second pump radiation to second luminescent material light conversion, etc.

In embodiments, the plurality of light sources are configured to provide UV radiation as first pump radiation, and the luminescent concentrators are configured to provide one or more of blue and green first converter light. In yet other embodiments, the plurality of light sources are configured to provide blue radiation as first pump radiation, and the luminescent concentrators are configured to provide one or more of green and yellow first converter light. Note, as also indicated below, such embodiments may also be combined.

The lighting device may further comprise a cooling element in thermal contact with the luminescent concentrator. The cooling element can be a heatsink or an actively cooled element, such as a Peltier element. Further, the cooling element can be in thermal contact with the light transmissive body via other means, including heat transfer via air or with an intermediate element that can transfer heat, such as a thermal grease. Especially, however, the cooling element is in physical contact with the light transmissive body. The term "cooling element" may also refer to a plurality of (different) cooling elements.

Hence, the lighting device may include a heatsink configured to facilitate cooling of the solid state light source and/or luminescent concentrator. The heatsink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. Hence, the term "heatsink" may also refer to a plurality of (different) heatsink. The lighting device may further include one or more cooling elements configured to cool the light transmissive body. With the present invention, cooling elements or heatsinks may be used to cool the light transmissive body and the same or different cooling elements or heatsinks may be used to cool the light sources. The cooling elements or heatsinks may also provide interfaces to further cooling means or allow cooling transport to dissipate the heat to the ambient. For instance, the cooling elements or heatsinks may be connected to heat pipes or a water cooling system that are connect to more remotely placed heatsinks or may be directly cooled by air flows such as generated by fans. Both passive and active cooling may be applied.

In particular embodiments, the elongated luminescent concentrator is clamped between 2 metal plates or clamped within a housing consisting of a highly thermal conductive material such way that a sufficient air gap between the elongated luminescent concentrator remains present to provide TIR (total internal reflection) of the light trapped within the elongated luminescent concentrator while a sufficient amount of heat may traverse from the elongated luminescent concentrator through the air gap towards the highly thermal conductive housing. The thickness of the air gap is higher than the wavelength of the light, e.g. higher than 0.1 µm, e.g. higher 0.5 µm. The elongated luminescent concentrator is secured in the housing by providing small particles between the elongated luminescent concentrator and the houses, such as small spheres of rods having a diameter higher than 0.1 µm, e.g. higher 0.5 µm, preferably smaller than 1 µm. Alternatively, the elongated luminescent concentrator may be secured in the housing by providing some surface roughness on the surfaces of the highly thermal conductive housing touching the elongated luminescent concentrator, the surface roughness varying over a depth higher than 0.1 µm, e.g. higher 0.5 µm, preferably smaller than 1 µm.

The density of such spheres, rods or touch points of a rough surface of the highly thermal conductive housing is relatively very small, such most of the surface area of the elongated light transmissive body remains untouched securing a high level of TIR reflections within of the light trapped within the elongated light transmissive body.

The lighting device may be part of or may be applied in e.g. office lighting systems, household application systems, shop lighting systems, home lighting systems, accent lighting systems, spot lighting systems, theater lighting systems, architectural lighting, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein. Here, the term "lighting system" may also be used for a (digital) projector. Further, the lighting device may be used for e.g. stage lighting (see further also below), or architectural lighting. Therefore, in embodiments the invention also provides a lighting system as defined herein, wherein the lighting system comprises a digital projector, a stage lighting system or an architectural lighting system. The lighting system may comprise one or more lighting devices as defined herein and optionally one or more second lighting devices configured to provide second lighting device light, wherein the lighting system light comprises (a) one or more of (i) the converter light as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, lens elements, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein.

Alternatively, the lighting device may be designed to provide high intensity UV radiation, e.g. for 3D printing technologies or UV sterilization applications. Alternatively, the lighting device may be designed to provide a high intensity IR light beam, e.g., to project IR images for (military) training purposes.

In yet a further aspect, the invention provides a luminaire comprising one or more lighting devices as defined herein.

In yet a further aspect, the invention provides a headlight or a taillight of a motor vehicle comprising one or more lighting devices as defined herein.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL, such as within about 3 SDCM from the BBL.

The terms "violet light" or "violet emission" especially relates to light having a wavelength in the range of about 380-440 nm. The terms "blue light" or "blue emission" especially relate to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of 380-780 nm. The term UV light may be UV-A (315-400 nm); UV-B (280-315 nm) or UV-C (200-280 nm). The term IR light may be light in the range above 780 nm. The term "white light" may in embodiments refer to light consisting of particular spectral compositions of wavelengths in the range between 380-780 nm, perceived nearby Planck's black body radiators having temperatures of about 1000 K and above.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.
The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
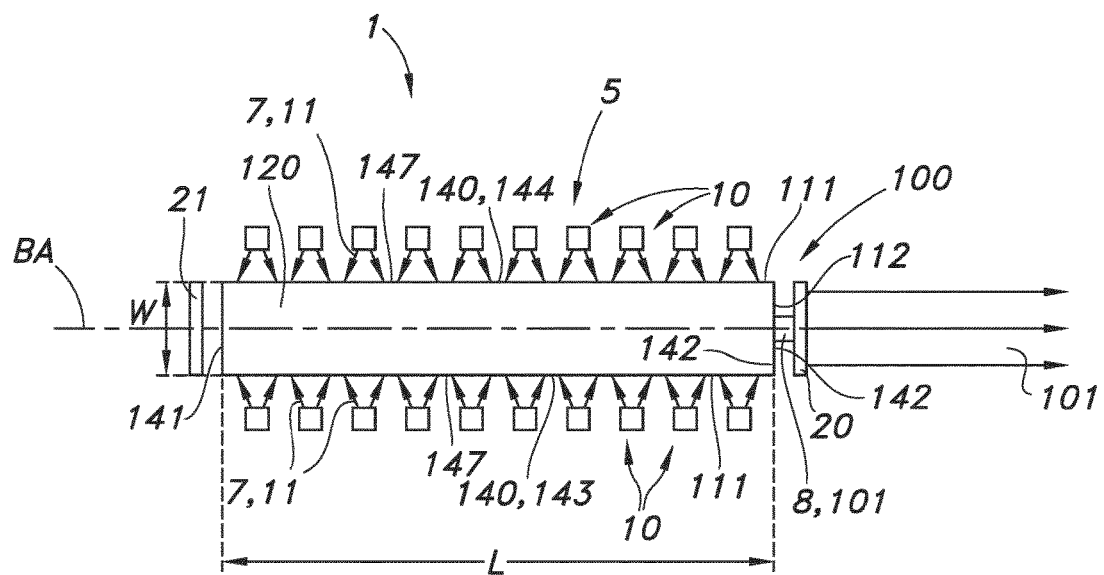
FIGS. 1a-1e schematically depict some aspects of the invention.

An embodiment of the lighting device as defined herein is schematically depicted in FIG. 1a. FIG. 1a schematically depicts a lighting device 1 comprising a plurality of solid state light sources 10 and a luminescent concentrator 5 comprising an elongated light transmissive body 100 having a first face 141 and a second face 142 defining a length L of the elongated light transmissive body 100. The elongated light transmissive body 100 comprising one or more radiation input faces 111, here by way of example two oppositely arranged faces, indicated with references 143 and 144 (which define e.g. the width W), which are herein also indicated as edge faces or edge sides 147. Further the light transmissive body 100 comprises a radiation exit window 112, wherein the second face 142 comprises the radiation exit window 112. The entire second face 142 may be used or configured as radiation exit window. The plurality of solid state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm$^2$. Reference BA indicates a body axis, which will in cuboid embodiments be substantially parallel to the edge sides 147. Reference 140 refers to side faces or edge faces in general.

The elongated light transmissive body 100 may comprise a ceramic material 120 configured to wavelength convert at least part of the (blue) light source light 11 into converter light 101, such as at least one or more of green and red converter light 101. As indicated above the ceramic material 120 comprises an $A_3B_5O_{12}$:Ce$^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used. Note that the light transmissive body may also essentially consist of a single crystal, which may in embodiments also be $A_3B_5O_{12}$:Ce$^{3+}$.

The light sources may in principle be any type of light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. The luminescent material 120 converts the light source light into luminescent material light 8 (see also FIG. 1e). Light escaping at the light exit window is indicated as converter light 101, and will include luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material. The lighting device 1 may be used as luminescent concentrator to pump another luminescent concentrator.

Figure 1B:
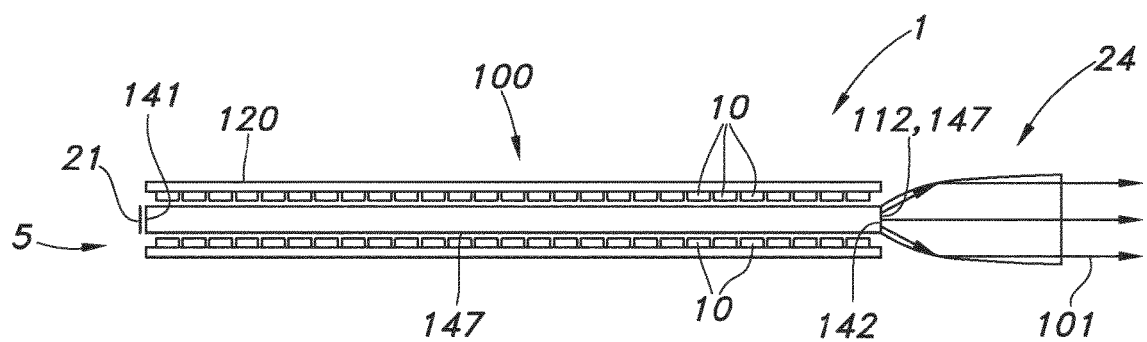

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 24, such as a CPC.

As shown in FIGS. 1a-1b and other Figures, the light guide has at least two ends, and extends in an axial direction between a first base surface (also indicated as first face 141) at one of the ends of the light guide and a second base surface (also indicated as second face 142) at another end of the light guide.

Figure 1C:
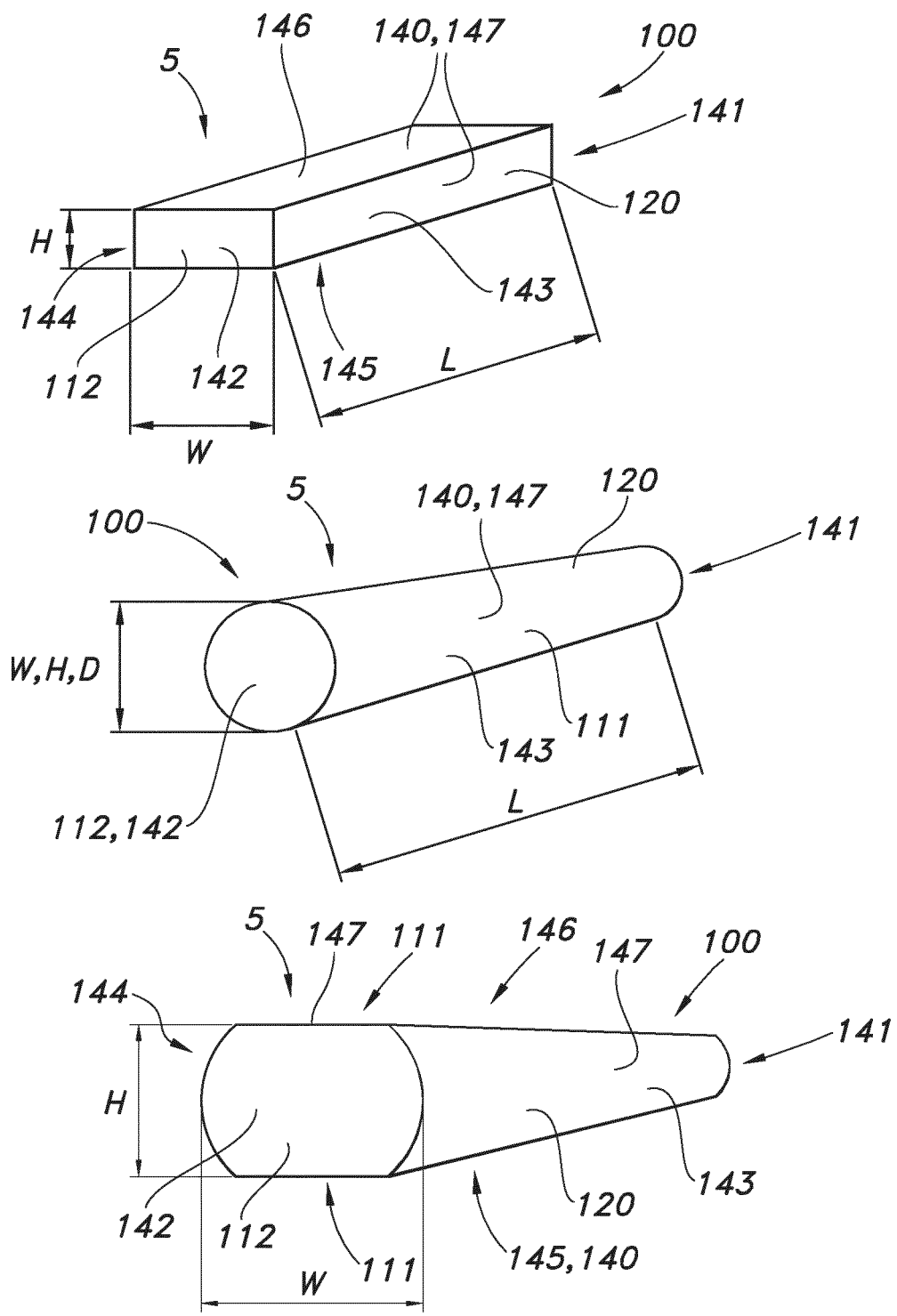

FIG. 1c schematically depicts some embodiments of possible ceramic bodies or crystals as waveguides or luminescent concentrators. The faces are indicated with references 141-146. The first variant, a plate-like or beam-like light transmissive body has the faces 141-146. Light sources, which are not shown, may be arranged at one or more of the faces 143-146 (general indication of the edge faces is reference 147). The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces.

In the context of the present application, a lateral surface of the light guide should be understood as the outer surface or face of the light guide along the extension thereof. For example, in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder. Herein, a lateral surface is also indicated with the term edge faces or side 140.

The variants shown in FIG. 1c are not limitative. More shapes are possible; i.e. for instance referred to WO2006/054203, which is incorporated herein by reference. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

The ceramic bodies or crystals, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-300, such as 10-100, like 10-60, like 10-20. Unless indicated otherwise, the term "aspect ratio" refers to the ratio length/width. FIG. 1c schematically depicts an embodiment with four long side faces, of which e.g. two or four may be irradiated with light source light.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

Note that, in particular for embodiments using a laser light source to provide light source light, the radiation exit window might be configured opposite to the radiation input face(s), while the mirror 21 may consist of a mirror having a hole to allow the laser light to pass the mirror while converted light has a high probability to reflect at mirror 21. Alternatively or additionally, a mirror may comprise a dichroic mirror.

Figure 1D:
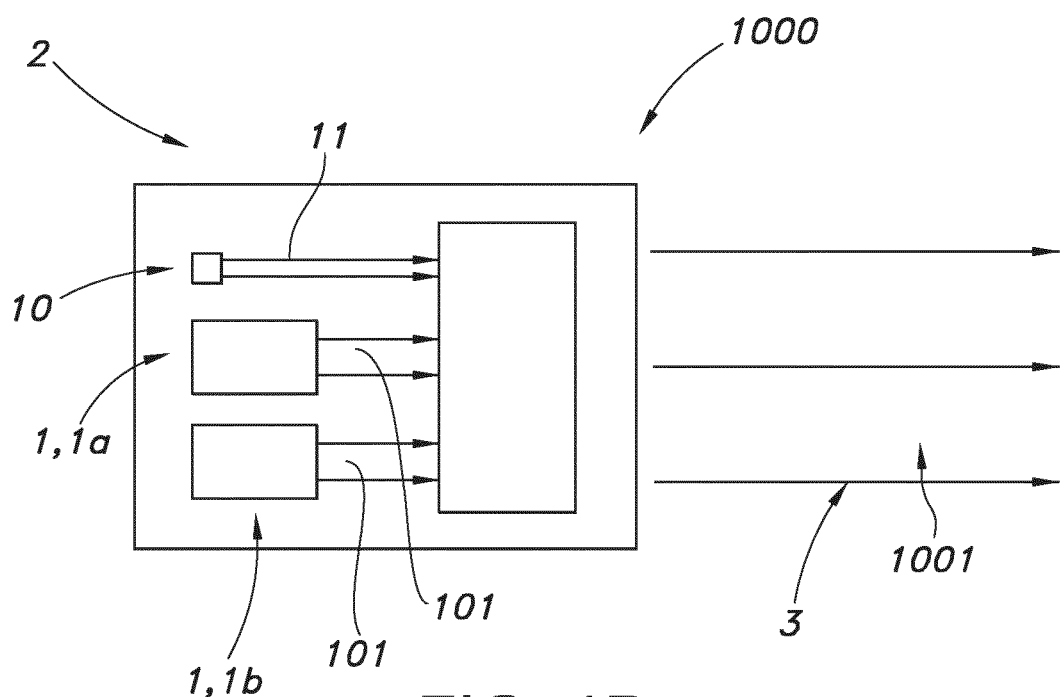

FIG. 1d very schematically depicts a projector or projector device 2 comprising the lighting device 1 as defined herein. By way of example, here the projector 2 comprises at least two lighting devices 1, wherein a first lighting device (1a) is configured to provide e.g. green light 101 and wherein a second lighting device (1b) is configured to provide e.g. red light 101. Light source 10 is e.g. configured to provide blue light. These light sources may be used to provide the projection (light) 3. Note that the additional light source 10, configured to provide light source light 11, is not necessarily the same light source as used for pumping the luminescent concentrator(s). Further, here the term "light source" may also refer to a plurality of different light sources. The projector device 2 is an example of a lighting system 1000, which lighting system is especially configured to provide lighting system light 1001, which will especially include lighting device light 101.

High brightness light sources are interesting for various applications including spots, stage-lighting, headlamps and digital light projection.

Figure 1E:
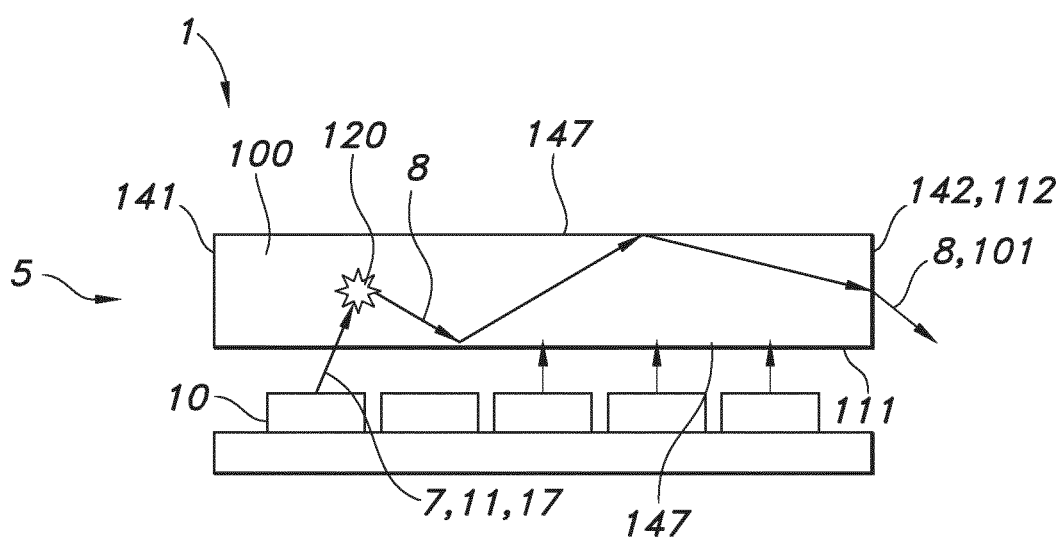

For this purpose, it is possible to make use of so-called luminescent concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1e).

High-brightness LED-based light source for beamer applications appear to be of relevance. For instance, the high brightness may be achieved by pumping a luminescent concentrator rod by a discrete set of external blue LEDs, whereupon the phosphor that is contained in the luminescent rod subsequently converts the blue photons into green or red photons. Due to the high refractive index of the luminescent rod host material (typically ~1.8) the converted green or red photons are almost completely trapped inside the rod due to total internal reflection. At the exit face of the rod the photons are extracted from the rod by means of some extraction optics, e.g. a compound parabolic concentrator (CPC), or a micro-refractive structure (micro-spheres or pyramidal structures). As a result the high luminescent power that is generated inside the rod can be extracted at a relatively small exit face, giving rise to a high source brightness, enabling (1) smaller optical projection architectures and (2) lower cost of the various components because these can be made smaller (in particular the, relatively expensive, projection display panel).

In the current solutions the optical efficiency may be limited due to the large difference in refractive index of the high index luminescent rod materials and the relatively low refractive index interconnect interface and CPC. If the refractive index of the interconnect interface and CPC could be increased towards the level of the luminescent element, it is predicted that 22-26% more light could be extracted which also results in a 22-26% increase of efficiency. Furthermore, in the current solution the coefficient of linear thermal expansion (CTE) of the glass CPC does not match to the CTE of the luminescent element. Upon heating-up and cooling down this leads to stresses on the interconnect interface and could lead to reliability issues. A silicone interface material can fortunately deform relatively easily to accommodate for most of these thermally induced stresses. Hence, it is a desire to overcome said optical losses associated to the current extraction optic solution while simultaneously ensuring a high reliability related to thermo-mechanical aspects.

It appeared not to be easy to find proper material combination that allows a reliable light extraction functionality for a luminescent element with a relatively high refractive index.

Amongst others, it is proposed to attach a glass or ceramic CPC, having preferable a relatively high refractive index, to the luminescent element material by means of a glass frit material consisting of especially (at least) three components: boron oxide $B_2O_3$, bismuth oxide $Bi_2O_3$ and zinc oxide ZnO. Such a frit consists of powdered glass compositions formed by the three mentioned components. The glass powder may be applied in the form of a paste e.g. by dispensing on the nose of the rod or by pressing into a small platelet and positioned on the nose of the rod (see more details in the process flow shown in the detailed section).

With the proper window of compositional ranges of these components this will ensure an improved optical efficiency as well as a good thermo-mechanical functionality:

High refractive index interconnect interface to extract virtually all light from the luminescent element and transfer this to the high refractive index CPC, by which it is extracted towards the ambient.

Close CTE matching with both the luminescent element and the high refractive index CPC to ensure an interconnect with low stress levels, both during the high temperature bonding process of the CPC to the luminescent element as well as during operating conditions of the lighting device.

High optical transparency of the interconnect interface: low absorption and scatter.

A sufficiently low softening point of the glass frit mixture in order for the frit to flow to form the interconnect interface while not deforming the high refractive index CPC.

A number of materials have been found that comply with one or more of the following conditions:

| | |
|---|---|
| Refractive index | $1.7 < n_{525\ nm} < 3.5$ |
| Linear thermal expansion | $7.0 < \alpha_{100°\ C.} < 8.0$  $8.0 < \alpha_{300°\ C.} < 9.0$ ppm/K |
| Softening point | $375 < T_{10^{7.6}\ dPas} < 550°$ C. |
| Water resistance | RW = 1 |
| Transparency | T > 95% at 50 μm thickness |

Specific embodiments of the garnet-CPC bonding use a low-melting $B_2O_3$—$Bi_2O_3$—ZnO glass with composition indicated in green in the ternary diagram in mol. % below with quadrilateral corner points:

25 mol % $B_2O_3$ 7.5 mol % $Bi_2O_3$ 67.5 mol % ZnO
80 mol % $B_2O_3$ 20 mol % $Bi_2O_3$ 0 mol % ZnO
65 mol % $B_2O_3$ 35 mol % $Bi_2O_3$ 0 mol % ZnO
22.5 mol % $B_2O_3$ 20 mol % $Bi_2O_3$ 57.5 mol % ZnO.

Figure 3:
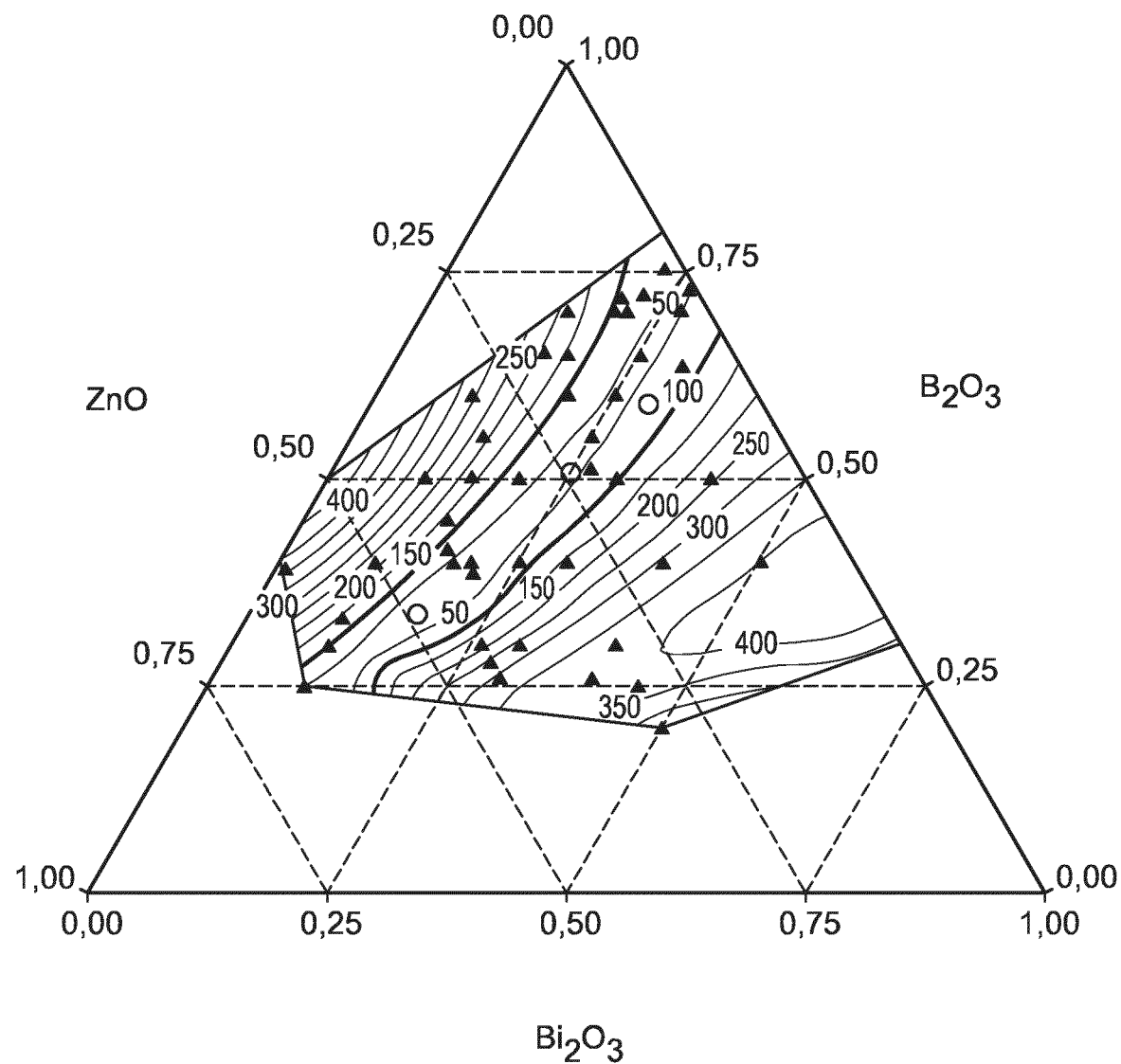
FIG. 3 depicts a ternary diagram defining a composition of the invention.

This is also schematically depicted in FIG. 3; note that this ternary diagram, as well as the above indicated in mol % and not in wt. %.

In addition, low levels of other atoms may be present in the glass frit layer after processing due to possible ion exchange with the rod and/or CPC material. For instance, some Al and Lu or Y could be detected in the glass frit without significantly changing its properties. Alternatively, small amounts of other atoms may be applied with little influence on the properties. For instance, small levels of $Li_2O$ could be added or exchanged with ZnO to lower the softening T of the glass. Therefore, we could define a compositional range window of the 3 main components, where the wt. % levels do not add-up to 100% but, e.g. 95%, as the remainder could be composed of other material types.

A number of glass materials were made, amongst others with 22 wt. %, 73 wt. % and 5 wt. % of boron oxide, bismuth oxide and zinc oxide, respectively, and with 21 wt. %, 68 wt. % and 11 wt. % of boron oxide, bismuth oxide and zinc oxide, respectively.

A basic process was executed wherein the oxides as powder were combined with a liquid and a binder to create a suspension, which was provided as suspension on the radiation exit window of an elongated body. The body was heated to bake out the binder and then heated to form a molten frit droplet (molten connector). In a furnace at elevated temperature the elongated body and beam shaping element were joined together with the molten interconnect in between, after which cooling provided the desired assembly.

As an alternative embodiment of frit bonding, direct garnet-glass bonding could potentially be possible above the softening point of the glass CPC.

Other alternative materials compositions that meet our requirements for bonding with proper optical and thermo-mechanical properties may exist. For instance, a mixture of $ZnO$—$Bi_2O_3$—$P_2O_5$ could be used. Being relatively sensitive to water this mixture is less preferred over the $B_2O_3$—$Bi_2O_3$—$ZnO$ system.

Various materials can be identified as candidates to attach the CPC to the Luminescent element with the proposed glass frit solution: high index glass CPC, high index ceramic materials such as: YAG, $Y_2O_3$, Spinel, materials similar to the Luminescent element: LuAG, LuYAG, YAG, GdYAG, etc.

When ceramic CPCs are used, as described above, a much wider range of frit materials may be used for interconnect as there is no softening point of the CPC to consider. As such, there is no strict need for a low softening temperature of the frit.

Especially, $n1/n2 \le 1.1$, such as more especially $n1/n2 \le 1.08$. Further, especially, $0.9 \le n1/n2 \le 1.1$, even more especially $0.95 \le n1/n2 \le 1.08$, such as $0.95 \le n1/n2 \le 1.05$. The index of refraction of the elongated body 100 is indicated with n1 and the index of refraction of the beam shaping optical element 224 is indicated with n2.

Figure 2A:
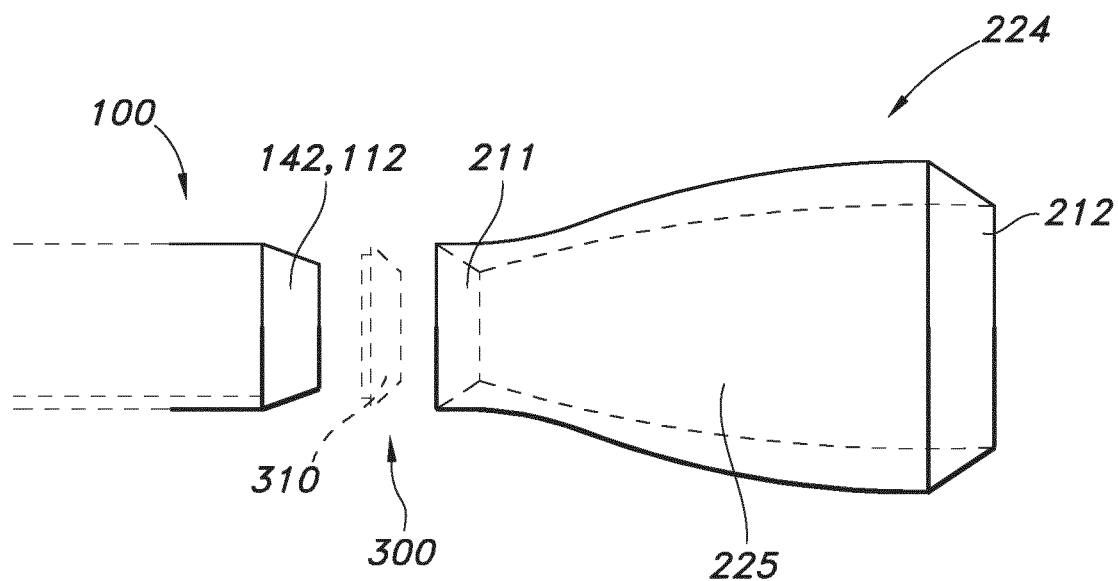
FIGS. 2a-2c schematically depict some embodiments.

FIG. 2a schematically depicts part of the lighting device 1, but yet without the beam shaping element 224 connected to the elongated body 100. An optical connector 300, comprising glass material 310 is depicted with dashed lines, indicating that this connector is optional.

The beam shaping optical element 224 or an optical connector 300 configured between the elongated light transmissive body 100 and the beam shaping optical element 224 comprise glass material 310, wherein especially the glass material 310 is based on at least $Bi_2O_3$ and for instance one or more of ZnO, $B_2O_3$, and $P_2O_5$ (see also above).

Figure 2B:
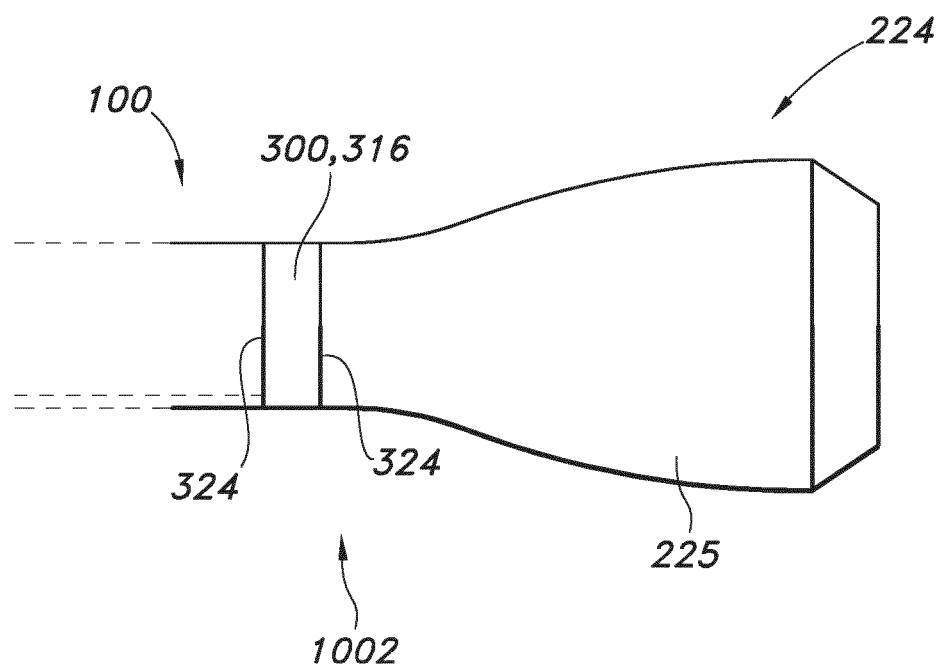

When heating the glass material 310 above the softening point, the glass material can be used to adhere the beam shaping element to the elongated body 100 via the connector, see FIG. 2b. When the beam shaping optical element 224 comprises the glass material 310, then the beam shaping optical element can be adhered to the elongated body 100 directly. Frit connections, i.e. the interfaces between the materials are indicated with reference 324.

The beam shaping optical element 224 is thus optically coupled with the radiation exit window 112. The beam shaping element may be a light transmissive body, indicated with reference 225. The beam shaping optical element 224 comprises a radiation entrance window 211 configured to receive at least part of the converter light and a radiation exit window 212. The distance between the radiation entrance window 211 and the radiation exit window 212 defines a length of a light transmissive body 225 of the beam shaping optical element 224. Especially, the beam shaping optical element 224 comprises a light transmissive body where the radiation exit window 212 has a larger cross section than the radiation entrance window 211. Hence, the beam shaping optical element may tapers from the radiation exit window 212 to the radiation entrance window 211.

The beam shaping optical element 224 comprises a light transmissive body 225 with a radiation entrance window 211 which may have an area and cross section which may be essentially the same as the area and cross-section of the radiation exit window 112 of the elongated body 100. When the connector 300 is configured in between the elongated body 100 and the beam shaping element 224, then the connector has also essentially the same area and cross-section as the radiation exit window 112 and the radiation entrance window 211.

FIG. 2b schematically depicts a second assembly 1002 comprising the elongated light transmissive body 100, the beam shaping optical element 224 optically coupled with the first radiation exit window 112, the beam shaping optical element comprising a radiation entrance window 211 configured to receive at least part of the converter light 101, and the optical connector 300 configured between the elongated light transmissive body 100 and the beam shaping optical element 224 comprising a glass material 310. The elongated light transmissive body 100 and the beam shaping optical element 224 are associated to each other via the optical connector 300, wherein the beam shaping optical element 224 comprises an optical element material 240 different from the glass material 310.

Figure 2C:
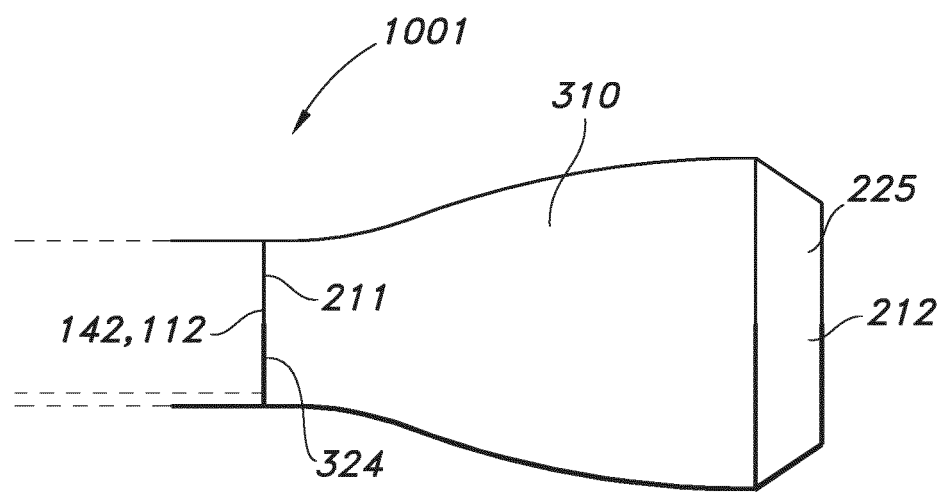

FIG. 2c schematically depicts an embodiment of a first assembly 1001 comprising the elongated light transmissive body 100, the beam shaping optical element 224 optically coupled with the first radiation exit window 112, the beam shaping optical element comprising a radiation entrance window 211 configured to receive at least part of the converter light 101; wherein the beam shaping optical element 224 has a second index of refraction n2. The beam shaping optical element 224 comprises a glass material 310. The elongated light transmissive body 100 and the beam shaping optical element 224 are associated to each other with a glass frit connection 324.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. Where stated that an absorption, a reflection or a transmission should be a certain value or within a range of certain values these values are valid for the intended range of wavelengths. Such, if stated that the transmission of an elongated luminescent light transmissive body is above 99%/cm, that value of 99%/cm is valid for the converted light rays within the desired range of wavelengths emitted by the lighting device 1, while it would be clear to the person skilled in the art that the transmission of an elongated luminescent light transmissive body will be well below 99%/cm for the range of wavelengths emitted by the light sources 10, since the source light 11 is intended to excite the phosphor material in the elongated luminescent light transmissive bodies such that all the source light 11 preferably is absorbed by the elongated luminescent light transmissive bodies instead of highly transmitted.

The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Practical designs may be further optimized the person skilled in the art using optical ray trace programs, such particular angles and sizes of microstructures (reflective microstructures or refractive microstructures) may be optimized depending on particular dimensions, compositions and positioning of the one or more elongated light transmissive bodies.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
one or more light sources configured to provide light source light;
a luminescent element comprising an elongated light transmissive body having a first face and a second face defining a length (L) of the light transmissive body, the light transmissive body comprising one or more radiation input faces and a first radiation exit window, wherein the second face comprises the first radiation exit window; the elongated light transmissive body comprising a luminescent material configured to convert at least part of light source light received at one or more radiation input faces into luminescent material light, and the luminescent element configured to couple at least part of the luminescent material light out at the first radiation exit window as converter light; wherein the light transmissive body has a first index of refraction n1;
a beam shaping optical element optically coupled with the first radiation exit window, the beam shaping optical element comprising a radiation entrance window configured to receive at least part of the converter light; wherein the beam shaping optical element has a second index of refraction n2;
wherein:
$0.75 \leq n2 \leq 1.25$;
an optical connector configured between the elongated light transmissive body and the beam shaping optical element, the optical connector comprising a glass material, wherein the glass material has a composition selected from a range defined in the ternary $B_2O_3$—$Bi_2O_3$—ZnO diagram by the following compositions indicating the quadrilateral corner points of the range:

| mol % $B_2O_3$ | mol % $Bi_2O_3$ | mol % ZnO |
| --- | --- | --- |
| 25 mol % | 7.5 mol % | 67.5 mol % |
| 80 mol % | 20 mol % | 0 mol % |
| 65 mol % | 35 mol % | 0 mol % |
| 22.5 mol % | 20 mol % | 57.5 mol % | and wherein the beam shaping optical element comprises an optical element material (240) different from the glass material.

2. The lighting device according to claim 1, wherein the elongated light transmissive body comprises a garnet material.

3. The lighting device according to claim 1, wherein the optical connector comprises a glass frit connection.

4. The lighting device according to claim 1, wherein the elongated light transmissive body and the beam shaping optical element are associated to each other via the optical connector, wherein (i) the elongated light transmissive body and the optical connector are associated to each other with a glass frit connection and (ii) the optical connector and the beam shaping optical element are associated to each other with a glass frit connection, and wherein the beam shaping optical element comprises an optical element material different from the glass material.

5. The lighting device according to claim 4, wherein the one or more light sources are operated in a pulsed operation with a duty cycle selected from the range of 10-80%.

6. The lighting device according to claim 1, wherein the beam shaping optical element comprises a compound parabolic concentrator and a mirror partially covering the light exit face of the compound parabolic concentrator.

7. The lighting device according to claim 1, wherein the light transmissive body has a first coefficient of linear thermal expansion, wherein the beam shaping optical element has a second coefficient of linear thermal expansion, and wherein the optical connector has a third coefficient of linear thermal expansion, wherein a difference between the first coefficient of linear thermal expansion and the second coefficient is at most ±1 ppm/K, wherein a difference between the first coefficient of linear thermal expansion and the third coefficient is at most ±1 ppm/K, and wherein a difference between the second coefficient of linear thermal expansion and the third coefficient is at most ±1 ppm/K.

8. The lighting device according to claim 1, wherein the glass material (310) has a third index of refraction n3, wherein if n2<n1, then n3>n2, wherein if n2≥n1, then n3≥n1, and wherein one or more of 0.75≤n1/n3≤1.25 applies.

9. The lighting device according to claim 1, wherein the beam shaping optical element comprises a light concentrator, and wherein the light transmissive body has a bar-like shape having a width (W) and a high (H), wherein the width (W) is equal to or smaller than 1.7 mm, and wherein the height (H) is equal to or smaller than 1.1 mm.

10. A method of producing the lighting device according to claim 1, the method comprising (i) providing the elongated light transmissive body, the beam shaping optical element, and the optical connector, (ii) melting at least part of the glass material, and associating the elongated light transmissive body and the beam shaping optical element with the optical connector in between, (iii) providing one or more light sources at one or more radiation input faces.

11. An image projection system comprising one or more lighting devices according to claim 1.

12. A luminaire comprising one or more lighting devices according to claim 1.

13. A headlight or a taillight of a motor vehicle comprising one or more lighting devices according to claim 1.

* * * * *